United States Patent
Tregenza Dancer

(10) Patent No.: US 11,606,296 B2
(45) Date of Patent: Mar. 14, 2023

(54) LONGEST-PREFIX MATCHING DYNAMIC ALLOCATION IN COMMUNICATIONS NETWORK

(71) Applicant: MICROSOFT TECHNOLOGY LICENSING, LLC, Redmond, WA (US)

(72) Inventor: Colin Tregenza Dancer, Hampshire (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/174,325

(22) Filed: Feb. 11, 2021

(65) Prior Publication Data

US 2022/0231946 A1     Jul. 21, 2022

(30) Foreign Application Priority Data

Jan. 15, 2021   (GB) ..................... 2100573

(51) Int. Cl.
*H04L 41/5054*   (2022.01)
*H04L 45/748*    (2022.01)
*H04L 45/028*    (2022.01)
*H04L 45/745*    (2022.01)

(52) U.S. Cl.
CPC ......... *H04L 45/748* (2013.01); *H04L 45/028* (2013.01); *H04L 45/74591* (2022.05)

(58) Field of Classification Search
CPC .. H04L 45/748; H04L 45/028; H04L 45/7457
See application file for complete search history.

(56) References Cited

U.S. PATENT DOCUMENTS

| | | | |
|---|---|---|---|
| 8,578,468 B1* | 11/2013 | Yadav | ............ H04L 63/1483 726/13 |
| 10,091,105 B2 | 10/2018 | Liu et al. | |
| 10,476,798 B1* | 11/2019 | Siebenthaler | ........... H04L 45/74 |
| 10,742,549 B2 | 8/2020 | Dale | |

(Continued)

FOREIGN PATENT DOCUMENTS

KR          100890354 B1     3/2009

OTHER PUBLICATIONS

Asai, et al., "Poptrie: A Compressed Trie with Population Count for Fast and Scalable Software IP Routing Table Lookup", In Journal of ACM SIGCOMM Computer Communication Review, vol. 45, Issue 4, Aug. 17, 2015, pp. 57-70.

(Continued)

*Primary Examiner* — Abdelnabi O Musa
(74) *Attorney, Agent, or Firm* — Newport IP, LLC; Han K. Gim

(57) ABSTRACT

A method performed by a node of a communications network such as a virtual routing function or policy enforcement node comprises receiving at least one packet, such as an internet protocol packet having an associated address and obtaining one or more metrics. The method involves dynamically configuring a longest-prefix match process on the basis of at least the metric(s). The dynamically configured longest-prefix match process is used with the associated address to identify an action and the identified action is applied to the packet.

20 Claims, 8 Drawing Sheets

(56) References Cited

U.S. PATENT DOCUMENTS

| | | | |
|---|---|---|---|
| 2004/0006668 A1* | 1/2004 | Park | H04L 69/12 |
| | | | 711/108 |
| 2004/0024757 A1* | 2/2004 | Park | H04L 69/22 |
| 2017/0171079 A1 | 6/2017 | Dale | |
| 2017/0366455 A1* | 12/2017 | Pongracz | H04L 69/324 |
| 2019/0238458 A1 | 8/2019 | Pongracz et al. | |
| 2020/0042629 A1* | 2/2020 | Levy | G06F 16/90339 |

OTHER PUBLICATIONS

Saxena, et al., "N-FIB: Scalable, Memory Efficient Name-based Forwarding", In Journal of Network and Computer Applications, vol. 76, Sep. 2016, 12 pages.

Yu, et al., "A Fast, Small, and Dynamic Forwarding Information Base", In Proceedings of the ACM SIGMETRICS/International Conference on Measurement and Modeling of Computer Systems, Jun. 5, 2017, pp. 41-42.

"LPM6 Library", Retrieved from: https://doc.dpdk.org/guides/prog_guide/lpm6_lib.html, Retrieved Date: Feb. 22, 2021, 05 Pages.

Ganegedara, et al., "100+ Gbps IPv6 Packet Forwarding on Multi-Core Platforms", In Proceedings of IEEE Global Communications Conference, Dec. 9, 2013, pp. 2096-2101.

Gupta, et al., "Routing Lookups in Hardware at Memory Access Speeds", In Proceedings of IEEE INFOCOM, the Conference on Computer Communications, Seventeenth Annual Joint Conference of the IEEE Computer and Communications Societies. Gateway to the 21st Century, Mar. 29, 1998, pp. 1240-1247.

Zec, et al., "DXR: Towards a Billion Routing Lookups per Second in Software", In Journal of ACM SIGCOMM Computer Communication Review, vol. 42, No. 5, Oct. 2012, pp. 29-36.

Zec, et al., "Pushing the Envelope: Beyond Two Billion IP Routing Lookups per Second on Commodity CPUs", In Proceedings of 25th International Conference on Software, Telecommunications and Computer Networks, Sep. 21, 2017, 06 Pages.

Kijkanjanarat, Taweesak, "Fast Routing Lookup and Packet Classification for Next-Generation Routers", In the Dissertation Submitted to Polytechnic University for the Doctorate Degree of Philosophy in Electrical Engineering, Jan. 31, 2002, 138 Pages.

Kijkanjanarat, Taweesak, "Fast Routing Lookup and Packet Classification for Next-Generation Routers", In the Dissertation Submitted to Polytechnic University for the Doctorate Degree of Philosophy in Electrical Engineering, Jan. 31, 2002, pp. 1-138.

"International Search Report and Written Opinion Issued in PCT Application No. PCT/US21/061702", dated Mar. 10, 2022, 10 Pages.

* cited by examiner

LONGEST-PREFIX MATCHING DYNAMIC ALLOCATION IN COMMUNICATIONS NETWORK

CROSS-REFERENCE TO RELATED APPLICATION(S)

This non-provisional utility application claims priority to UK patent application number 2100573.1 dated entitled "LONGEST-PREFIX MATCHING DYNAMIC ALLOCATION IN COMMUNICATIONS NETWORK" and filed on 15 Jan. 2021 which is incorporated herein in its entirety by reference.

BACKGROUND

The present application is concerned with communications networks such as telecommunications networks, data communication networks and other types of communications networks which are packet-based. Often, one or more nodes in such communications networks have at least one longest-prefix match process which, given an example, searches for an item amongst a plurality of items. The search aims to find an item with a prefix that matches a prefix of the example and so that the matching prefix is as long as possible. The results of the search influence control of one or more processes in the communications network.

Longest-prefix match processes are resource intensive, taking up memory and/or compute cycles and thus impacting performance and cost of the communications network.

The embodiments described below are not limited to implementations which solve any or all of the disadvantages of known communications network nodes or communications networks.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method performed by a node of a communications network. The method comprises receiving at least one packet having an associated address and obtaining one or more metrics. The method involves dynamically configuring a longest-prefix match process on the basis of at least the metric(s). The dynamically configured longest-prefix match process is used with the associated address to identify an action and the identified action is applied to the packet.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
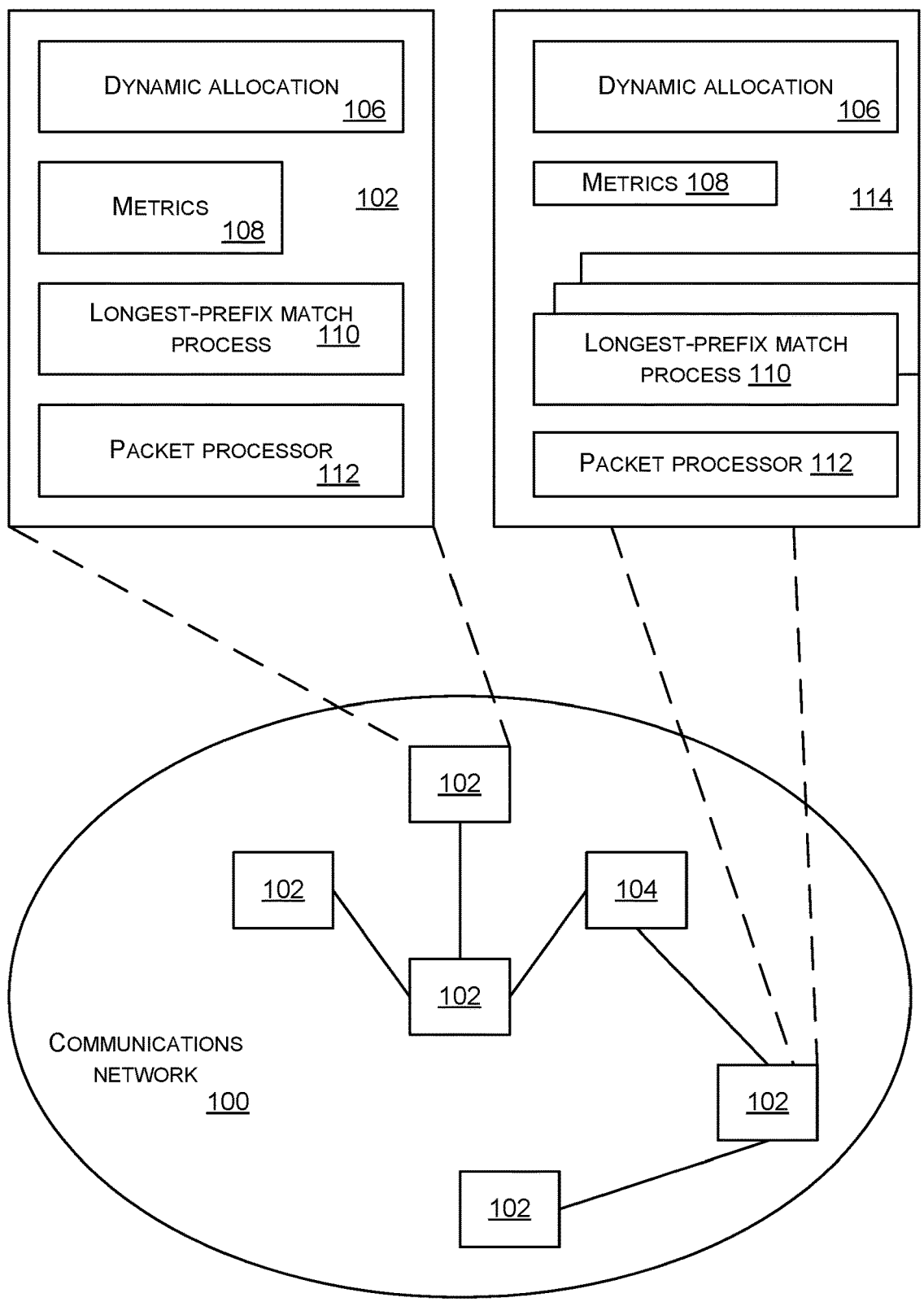
FIG. 1 is a schematic diagram of a communications network with at least one node having a longest-prefix match process and a dynamic allocation process.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples Longest-prefix match processes are used in a wide variety of communications network nodes including but not limited to: firewalls, policy enforcement nodes, forward information bases, routers, access control lists, virtual routing functions. A longest-prefix match process takes as input an example and searches a plurality of items to find one or more items which have a match between a prefix of the input example and a prefix of an individual one of the items. The search aims to find such a match where the prefix is as long as possible. Longest-prefix match processes are known to be resource intensive in terms of memory related resources (capacity, memory bandwidth, cache, ternary content addressable memory (TCAM) capacity, etc.), and/or compute cycles. Thus longest-prefix match processes influence performance and costs of communications networks.

Resources for longest-prefix match processes are typically fixed which leads to problems when deployment needs change over time. Consider a plurality of hardware routers which have been deployed as part of web service infrastructure for an online retail business. There may be a sudden need to double the number of routes which can be facilitated due to a growth in business or due to a failure elsewhere in the web service infrastructure. Previously it has been very difficult to address this type of situation in a fast and automated manner.

In another example, there may be a limit of 1000 routes that a particular hardware router is able to facilitate. If the number of routes needs to increase to 1002 there is a need to deploy additional routing capacity such as by instantiating one or more virtual routing functions in the infrastructure. As a result there is potential inefficiency since the routes may not be appropriately load balanced between the hardware router and the virtual routing functions.

It is recognized herein that it is possible to dynamically configure a longest-prefix match process in order to trade off memory resources used by the process against a number of compute cycles used by the process. Since a number of compute cycles is generally related to a time taken to complete a computation (at least for serial processing), the trade-off can also be thought of as between memory resource and a response time of the process (i.e. how long it takes to find a longest-prefix match). The inventor has recognized that it is beneficial to dynamically configure one or more longest-prefix match processes in a communications network in order to make more efficient use of resources (memory, compute cycle) and achieve accurate and fast response times. As a result performance of an individual communications network node is enhanced. It is also possible to improve performance of a communications network as a whole, and/or to provide differential treatment to different part of the network, classes of traffic or users. Manual tuning steps are either no longer needed, or greatly reduced in number/frequency, which reduces cost and minimizes error.

Dynamically configuring a longest-prefix match process is achieved by one or more of: selecting from a plurality of different longest-prefix match algorithms, selecting different ratios of hardware to software implementation for the longest-prefix match process, selecting values of one or more parameters of a longest-prefix match process, selecting different priorities to be given to individual longest-prefix match processes, selecting different amounts of resources shared between a plurality of longest-prefix match processes. Selecting different ratios of hardware to software implementation for a longest-prefix match process comprises determining how much hardware resource to use for executing the longest-prefix match process as compared with how much software resource to use. Hardware resources for executing a longest-prefix match process include but are not limited to: hardware routers, application specific integrated circuits (ASICs) and ternary content addressable memory (TCAM).

FIG. 1 is a schematic diagram of a communications network 100 which is a packet-based communications network such as an intranet, the internet, a telecommunications network, or other packet-based communications network. The communications network 100 comprises a plurality of nodes 102 in communication with one another via edges which are physical connections or wireless connections. One of the nodes 102 is shown exploded to reveal some but not all of the components in the node 102. The node has a dynamic allocation process 106, metrics 108, a longest-prefix match process 110 and a packet processor 112. More details about the node are given later with reference to FIG. 7. The dynamic allocation process 106 is implemented using any one or more of: software, hardware, firmware. It is able to dynamically configure the longest-prefix match process 110 in order to influence how memory is traded against compute cycles. The metrics 108 are stored in memory at the node 102 and comprise any one or more of: system metrics observed from the node 102, system metrics observed from the communications network 100, constraints. The longest-prefix match process 110 is implemented using any one or more of: software, hardware, firmware. The packet processor 112 is also implemented using any one or more of: software, hardware, firmware and it acts to receive packets incoming at the node 102 and process the incoming packets, such as by routing, filtering, wrapping, extracting payloads, or other actions according to the function of the node.

In the example of FIG. 1 two nodes 102 are shown as having a dynamic allocation process 106 and longest-prefix match process 110. However, in practice a plurality of the nodes 102 have one or more longest-prefix match processes 110.

FIG. 1 also shows a node 104 of the communications network which is optional and is a management node. More detail about the management node is described later with reference to FIG. 4.

In some cases a node 102 has a plurality of longest-prefix match processes within it as indicated in FIG. 1 at 114. In this case, dynamically configuring the longest-prefix match process comprises selecting the longest-prefix match process from a plurality of available longest-prefix match processes using information about resource requirements and performance of individual ones of the longest-prefix match processes. There is a plurality of longest-prefix match processes stored either at the communications network node 102 or at another location accessible to the communications network node 102. The resource requirements and performance of individual ones of the longest-prefix match processes is known in advance through calibration. Using rules, thresholds, machine learning or gradient descent optimization the communications network node 102 dynamically selects which longest-prefix match process to use in a particular situation taking into account the metrics and the resource requirements and performance.

The dynamic allocation process of the disclosure operates in an unconventional manner to achieve efficient use of a communications network node.

The dynamic allocation process of the disclosure improves the functioning of the underlying communications network node by adjusting how resources are used in a longest-prefix match process.

Alternatively, or in addition, the functionality of FIG. 1 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2A:
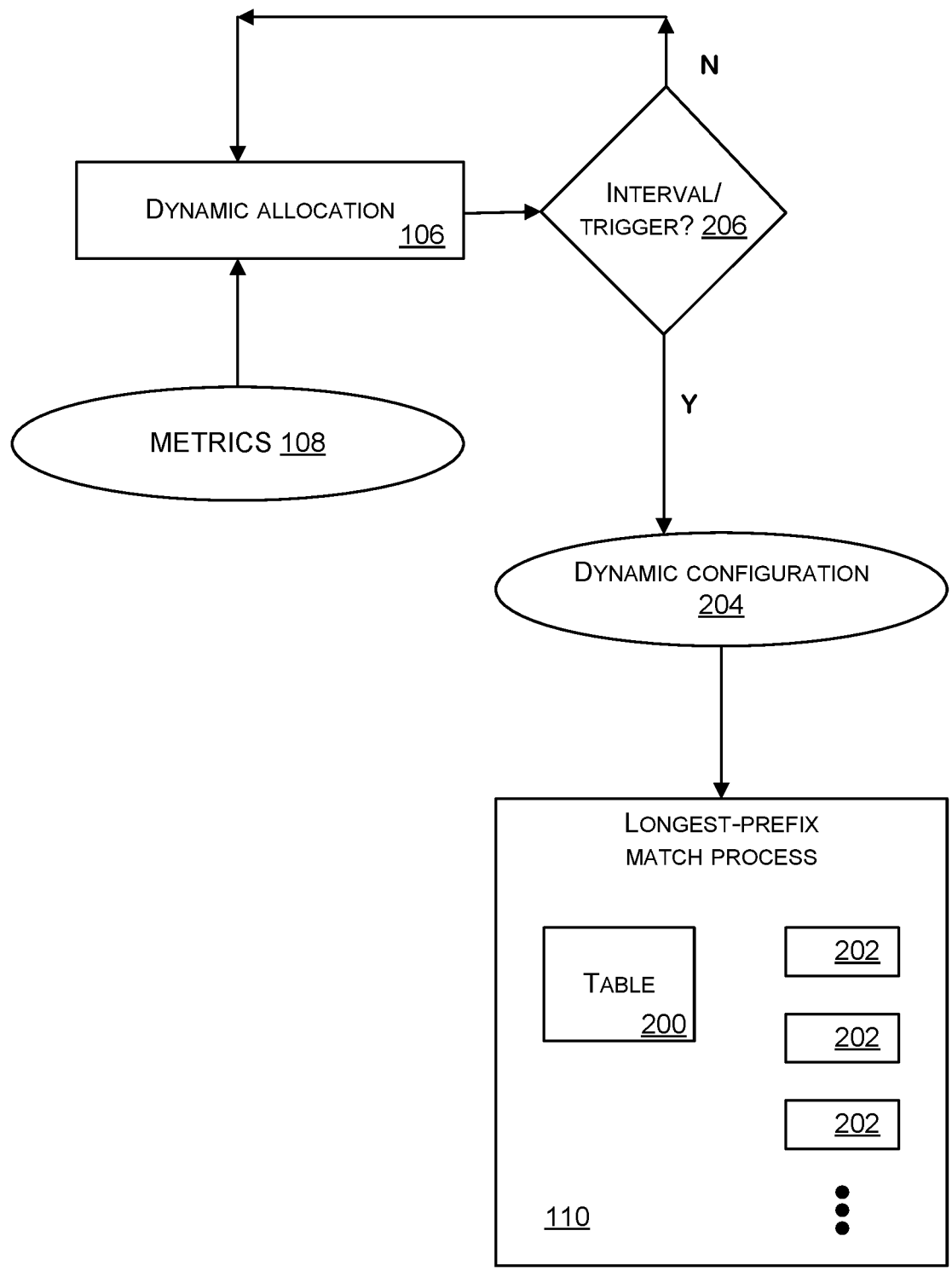
FIG. 2A is a schematic diagram of a longest-prefix match process component of a communications network node in more detail.

In an embodiment now described with reference to FIG. 2A, dynamically configuring the longest-prefix match process comprises setting values of one or more parameters of the longest-prefix match (LPM) process. Using the longest-prefix match process and the associated address to identify an action comprises searching one or more data structures at the node to find an entry having a longest-prefix match with the associated address. FIG. 2A is a schematic diagram of a longest-prefix match process 110 comprising one or more data structures. The data structures comprise a table 200; and a plurality of lists 202 or tree data structures.

In a first stage of the longest-prefix match process, the table 200 is directly indexed using a limited prefix of the address to be looked up. In an example the table has a single column either directly specifying an action (such as a next hop node of the communications network or an action to filter a packet by not forwarding it) or a pointer to one of the searchable lists 202, each entry of which contains a prefix to match against, and an action.

During an LPM lookup, a limited prefix of the address to be matched is used to index table 200 and find an entry in table 200. If the entry refers to an action, that action is applied to the packet. If the indexed entry in table 200 references a 202 list, then that the referenced list is searched for a longest match against the full address, using an appropriate method such as a tree search or a binary search. Once the relevant entry is found, the associated action is applied.

To search a list 202 for a correct action is resource intensive, requiring multiple memory accesses, and takes longer than an action found by directly indexing in table 200.

The table 200 and lists 202 are stored in working memory at the communications network node and so the size of these data structures affects memory resource usage (such as occupancy, cache usage, memory bandwidth). Working memory in this context means updatable memory used to store dynamic data structures. It includes a range of different storage types external to a hardware element such as a processor or ASIC (including dynamic random access memory (DRAM), static random access memory (SRAM), ferroelectric random access memory (FRAM) and TCAM), or internal storage to a hardware element such as cache. In an example for internet scale routing, the table is typically more than ten mega bytes in size.

The size of the table 200 is determined by a parameter k which is also a number of bits of a prefix to be matched in the longest-prefix match process. The size of the table is set at two to the power k. Adjusting k influences how much memory is used by the table 200 and how many lists 202 there are. The parameter k controls a size of the table 200 with respect to the size of the aggregated list or tree data structures 202. Larger k will generally lead to faster lookups, at the expense of more memory resources. By dynamically adjusting the value of k in response to metrics it is possible to adjust the trade off, and make the communications network node (and hence the communications network) more efficient (balancing performance with resource usage and number of prefixes which can be matched).

In some but not all embodiments the value of k is set below 16 even though using a value below 16 is going against a long held prejudice whereby values of k are 16 or above. The inventor has recognized that using values of k below 16 is extremely useful for achieving efficiency when a node needs to implement large numbers of separate LPM tables, each with only a small number of entries. If k is very small, including zero, the table 200 becomes de minimis and the longest-prefix matching process is entirely a search of a list 202. This allows a node to be dynamically optimized to support a variable number of LPM tables, each with a different number of prefixes, without needing to have a separate algorithm optimized for the smaller tables. More detail is given later in this document with reference to FIG. 5 for the situation where there are a variable number of LPM tables.

FIG. 2A shows dynamic configuration data 204 being sent to the longest-prefix match process 110 from the dynamic allocation process 106. The dynamic configuration data 204 is one or more of: a value of k, instructions to use one of a number of different LPM algorithms as described below with reference to FIG. 2B, instructions to use hardware assist TCAM or other hardware to give the longest-prefix match functionality. The dynamic configuration data 204 is sent either at time intervals or in response to a trigger (according to check 206) such as when response times of the longest-prefix match process exceed a threshold, or available memory resources in the system cross one of a number of defined thresholds. The dynamic configuration data 204 has been calculated by a dynamic allocation process 106 as indicated in FIG. 1. The dynamic allocation process uses one or more of: rules, machine learning, gradient descent optimization, to compute the configuration data. The dynamic allocation process takes into account the metrics 108.

Adjusting the longest-prefix match process to use a new value of k (or a different algorithm) is not straightforward since the table 200 and lists 202 have to be re-built or updated. Thus in some examples, the dynamic configuring happens only when the data structures are being updated anyway as part of another process, such as to update the prefixes and actions.

The other process which updates the prefixes and actions is able to create a second set of data structures (table 200 and lists 202) and populate the second set of data structures with the new prefixes and actions. The second set of data structures is then atomically switched with the existing data structures. In this way there is no loss of service of the algorithm and any inconsistencies and conflicts which might arise if the current data structures are updated is avoided. In some examples, dynamically configuring the longest-prefix match process occurs together with an atomic switch of the one or more data structures. By doing the dynamic configuration as part of the atomic switch process efficiency and also robustness is achieved.

As mentioned above, one or more metrics 108 are obtained by the communications network node 100. The metrics are actively and/or passively obtained by the communications network node. The metrics are actively obtained by querying one or more elements of the communications network node 100 (such as an operating system or application specific resource manager) or by querying other communications network nodes in the communications network. In some cases the metrics are obtained passively as a result of the communications network node being sent metrics by a management node 104 of the communications network or by an operating system of the communications network node. The metrics are observed from the node or communications network.

A non-exhaustive list of examples of metrics is one or more of: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, usage.

The dynamic configuration optionally takes into account one or more constraints. Constraints are criteria which are pre-configured, specified by an operator, or automatically computed using rules. A non-exhaustive list of constraints is one or more of: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, usage. One or more of the constraints relate to other nodes of the communications network.

Figure 2B:
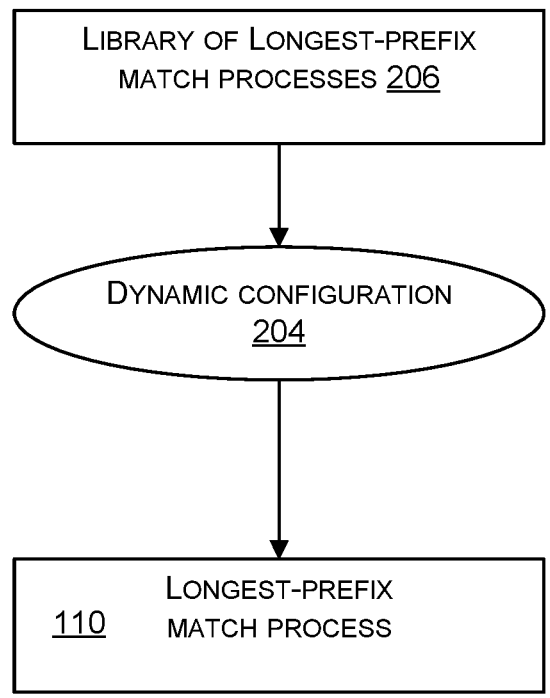
FIG. 2B is a schematic diagram of use of a library of longest-prefix match processes.

FIG. 2B is a schematic diagram of the situation where there is a library of longest-prefix match processes 206 comprising a plurality of different longest-prefix match algorithms. The dynamic configuration data 204 is an indication of one of the longest-prefix match algorithms to be deployed at longest-prefix match process 110. A non-exhaustive list of examples of longest-prefix match algorithms is DIR, DXR.

Figure 3:
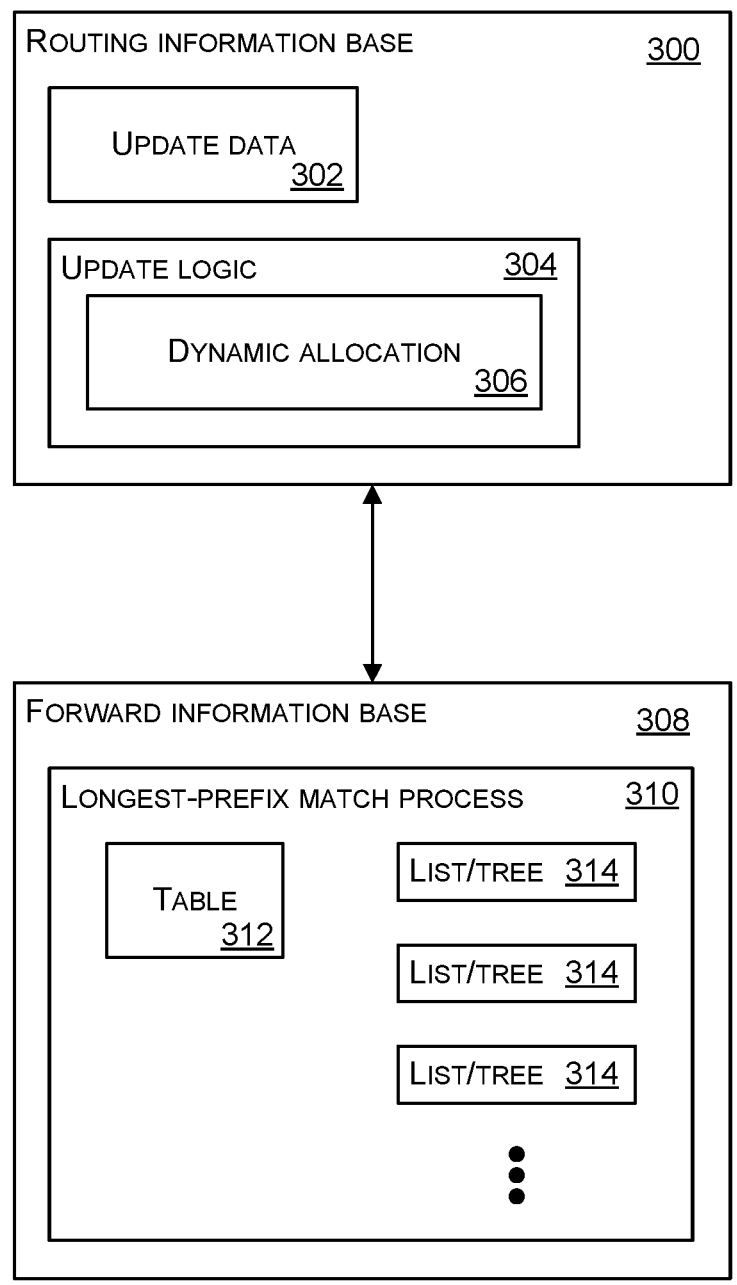
FIG. 3 is a schematic diagram of a routing information base and a forward information base.

An embodiment in which the communications network is a router is now given with reference to FIG. 3. The communications network node has a routing information base 300 and a forward information base 308. The forward information base 308 receives packets incoming to the router and forwards the packets to the appropriate next hop node of the communications network. To identify the appropriate next hop node for a given packet the forward information base uses a longest-prefix match process 310 with an address of the incoming packet as input. The result of the longest-prefix match process is an address of a next hop node to forward the packet to. The longest-prefix match process 310 uses data structures comprising a table 312 and one or more lists or trees 314. The size of the table 312 is specified using parameter k by a dynamic allocation process 306 in the routing information base 300. The dynamic allocation process 306 is part of update logic 304 of the routing information base.

The dynamic allocation process 306 uses metrics. area non-exhaustive list of metrics is: a number of routes in the forward information base at the node and a packet rate in the forward information base, an amount of available memory, a number of available memory controllers, a cache size, usage of processor resources, buffer availability, ternary content-addressable memory, TCAM, usage. An operating system of the forward information base makes the packet rate of the forward information base available to the dynamic allocation process. The dynamic allocation process knows the number of routes in the forward information base from historical information of updates sent by the routing information base to the forward information base. The dynamic allocation process determines the values of the number of available memory controllers, a cache size, usage of processor resources, buffer availability, TCAM usage, by querying an operating system or other entities.

The dynamic allocation process uses one or more rules which specify what value of k to use for specific values or ranges of the metrics and specific values of one or more constraint(s). The constraints are specified values or one or more of the metrics which are bounds or limits for the dynamic allocation process to keep within. Alternatively or in addition the dynamic allocation process uses a machine learning system to predict what value of k to use for specific values or ranges of the metrics and constraint(s). Alternatively or in addition the dynamic allocation process uses a gradient descent optimization process to search for a value of k which will satisfy the constraints.

The routing information base 300 collects update data 302 about updates to the forward information base 308 which are to be made. The update data 302 is sent to the routing information base 300 by one or more of the other communications network nodes such as where a new node is added to the communications network. The update data 302 is collected and eventually used to update the forward information base. The update logic 304 computes a second table and second list/tree data structures using the update data 302. The update logic instructs the forward information base to make an atomic switch of the current table 312 and list/trees 314 with the second table and second lists/trees. The second table and second list/tree data structures are computed using the new value of k calculated by the dynamic allocation process 306. Thus when the atomic switch is made it deploys the new value of k as well as the update data 302 into the forward information base. After the atomic switch the forward information base operates to forward packets according to the second table and second lists/trees. In this way, the dynamic configuration of the longest-prefix match process optimizes use of resources of the node within the specified constraints.

The examples of FIGS. 2A and 3 are extendable to take into account metrics from other nodes in the communications network. The communications network node 102 obtains metrics from other nodes in the communications network by querying the other nodes or by receiving messages from the other nodes. The metrics are taken into account when setting a value of the parameter of the longest-prefix match process.

In a preferred embodiment the node 102 comprises a virtual routing function or a policy enforcement node. The longest-prefix match process is configured to carry out internet protocol address matching to match internet protocol addresses of incoming packets to address control lists or routing tables.

Figure 4:
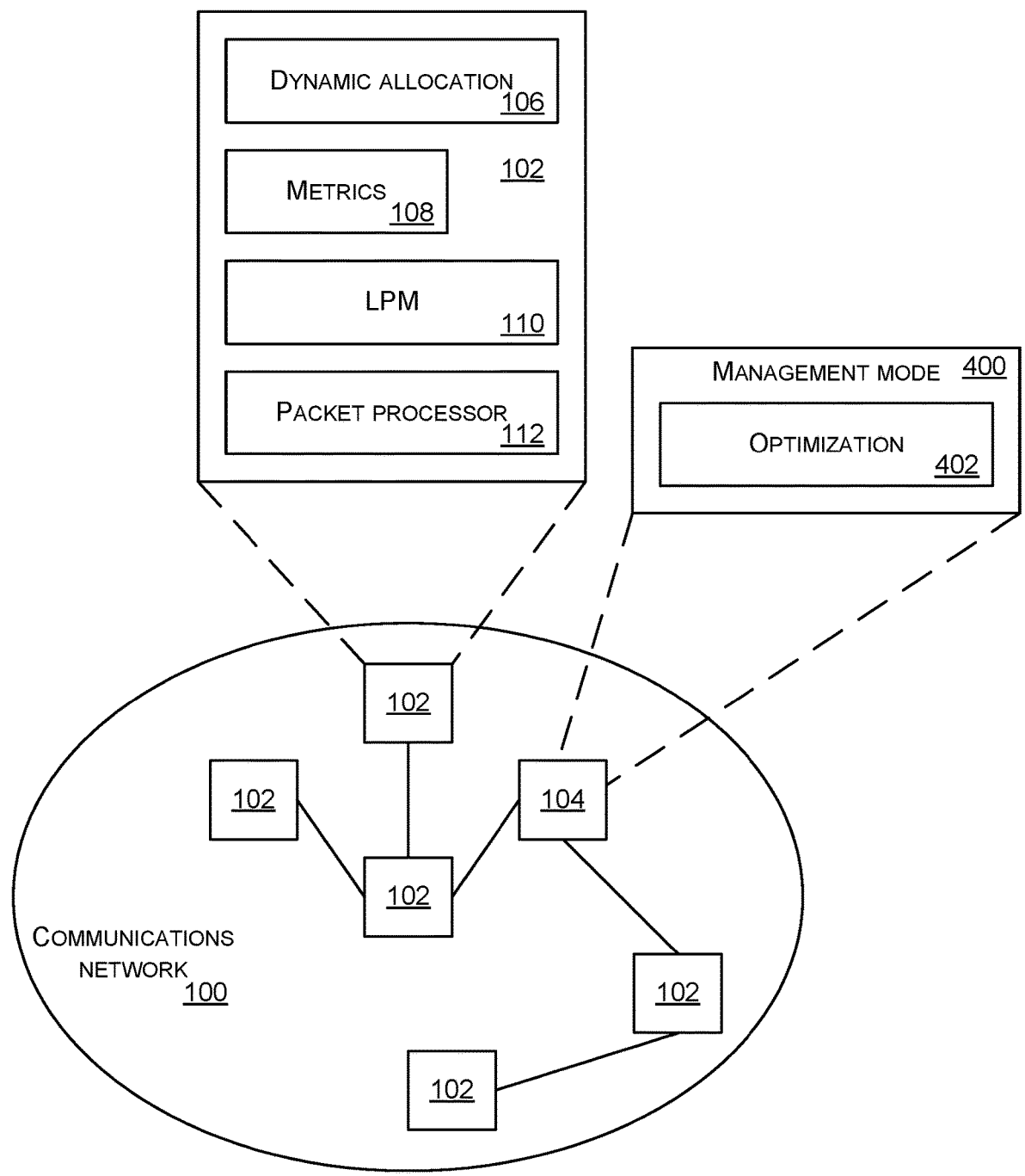
FIG. 4 is a schematic diagram of the communications network of FIG. 1 and showing a management node in more detail.

FIG. 4 shows a communications network 100 comprising a management node 400 in addition to communications network nodes 102. One or more of the communications network nodes 102 comprises a dynamic allocation process 106, metrics 108, a longest-prefix match process 110 and a packet processor 112 as in FIG. 1.

The management node 400 comprises an optimization process 402 which comprises one or more of: a machine learning model, rules, a gradient descent optimization process. The management node 104 obtains metrics from the communications network nodes 102. The metrics are as described earlier in this document. Using the metrics the management node 104 computes dynamic allocations for individual ones of the communications network nodes 102 and sends the dynamic allocations to the respective nodes 102. The dynamic allocations computed by the management node seek to optimize efficiency of the communications network as a whole and are referred to as overall dynamic configurations.

The management node sends the dynamic allocations to the respective nodes 102 at a first cadence. The individual nodes 102 themselves also compute their own dynamic allocations and do so at a second cadence. The first cadence is controllable with respect to the second cadence. For example, the management node operating at the first cadence does so at a lower frequency as compared with the second cadence. The management node 400 takes longer to obtain its metrics from the nodes of the communications network and benefits from having a longer cadence than the cadence of an individual node dynamic allocation process. Being able to control the first cadence with respect to the second cadence gives improved efficiency.

The management node is able to take into account a policy. In an example, a specified group of the nodes 102 is to be given a lower quality of service than another specified group of the nodes according to a policy. The management node 400 takes into account the policy when calculating the dynamic allocations. In this way it is possible to differently configure individual sets of the longest-prefix match processes.

One or both of the management node 400 and the individual ones of the communications network nodes 102 carry out dynamic configuration in response to one or more of: an interval of time, a resource limit being reached.

Figure 5:
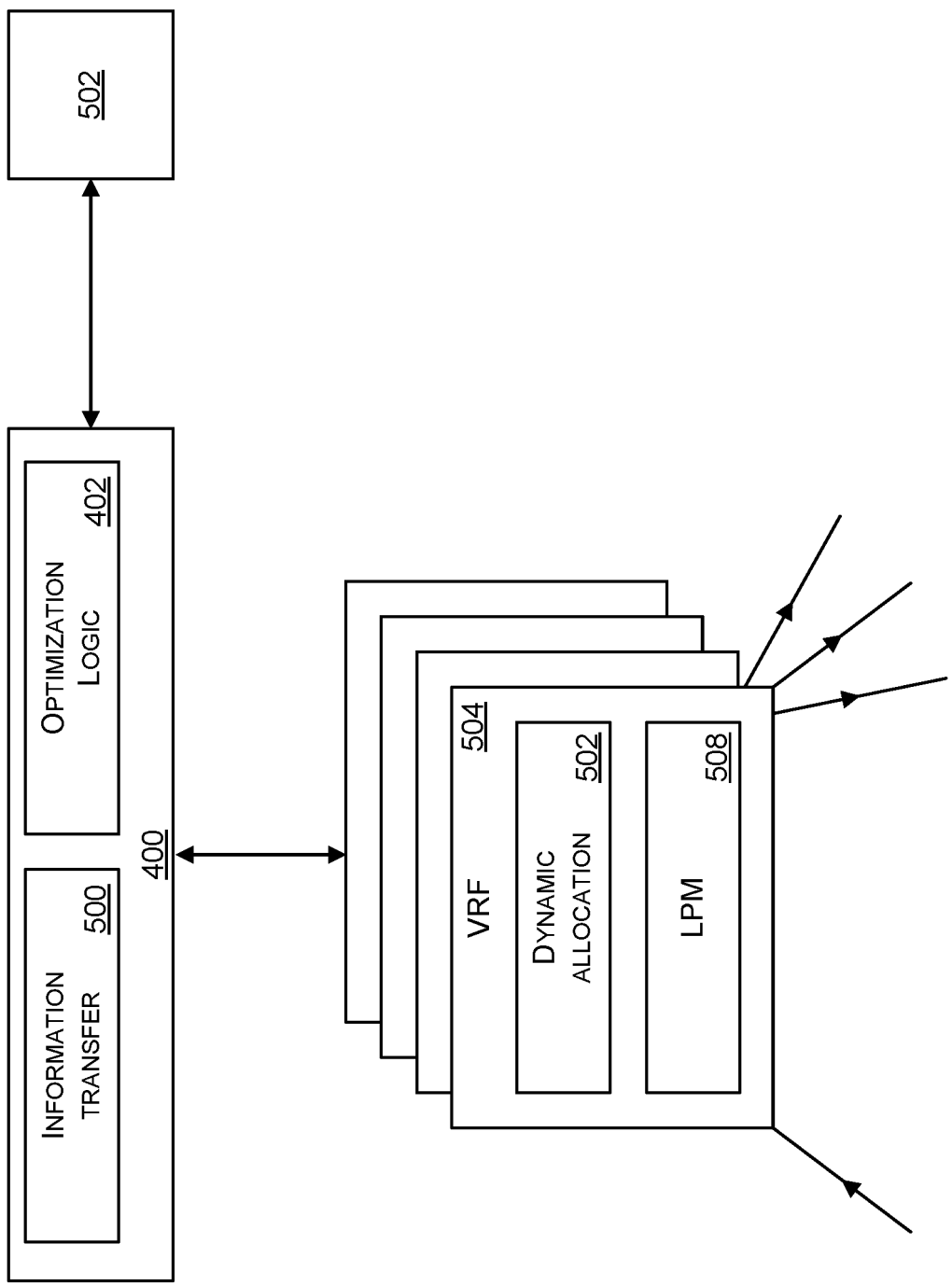
FIG. 5 is a schematic diagram of a plurality of virtual routing functions and a management node.

FIG. 5 is a schematic diagram of a communications network comprising a plurality of virtual routing functions 504 in communication with a management node 400. Each virtual routing function 504 comprises a dynamic allocation process 506 and a longest-prefix match process 508. Each virtual routing function is configured to receive incoming packets (represented by an arrow into box 504 in FIG. 5) and to forward packets to different next hop nodes of the communications network (indicated by arrows out of box 504 in FIG. 5). The management node 400 is in communication with other parts of the communications network represented by box 502 in FIG. 5.

The management node 400 has an information transfer component which has functionality to manage transfer of information within the communications network.

The management node 400 has optimization logic 402. Optimization logic 402 receives metrics from the virtual routing functions 504. Optimization logic 402 also has constraints and policies. The optimization logic uses one or more of: rules, machine learning, gradient descent optimization, to compute, for each of the virtual routing functions, a dynamic configuration of the longest-prefix match process 508. The optimization logic 402 sends its results to the individual virtual routing functions 504 at a first cadence. The individual routing functions compute their own dynamic configurations of the longest-prefix match process 508 at a second cadence different from the first cadence. The management node is informed of the second cadence and is able to control the first and or second cadence in order to achieve efficiency.

In the example of FIG. 5 the management node 400 is depicted as physically separate from the virtual routing functions. However, in some deployments the management node is in the same physical entity as the virtual routing functions and there are at least some resources shared by the management node and virtual routing functions. In that case the dynamic allocation may include apportioning the shared resources between the virtual routing functions, optimizing for through put, priority treatment and other factors.

Figure 6:
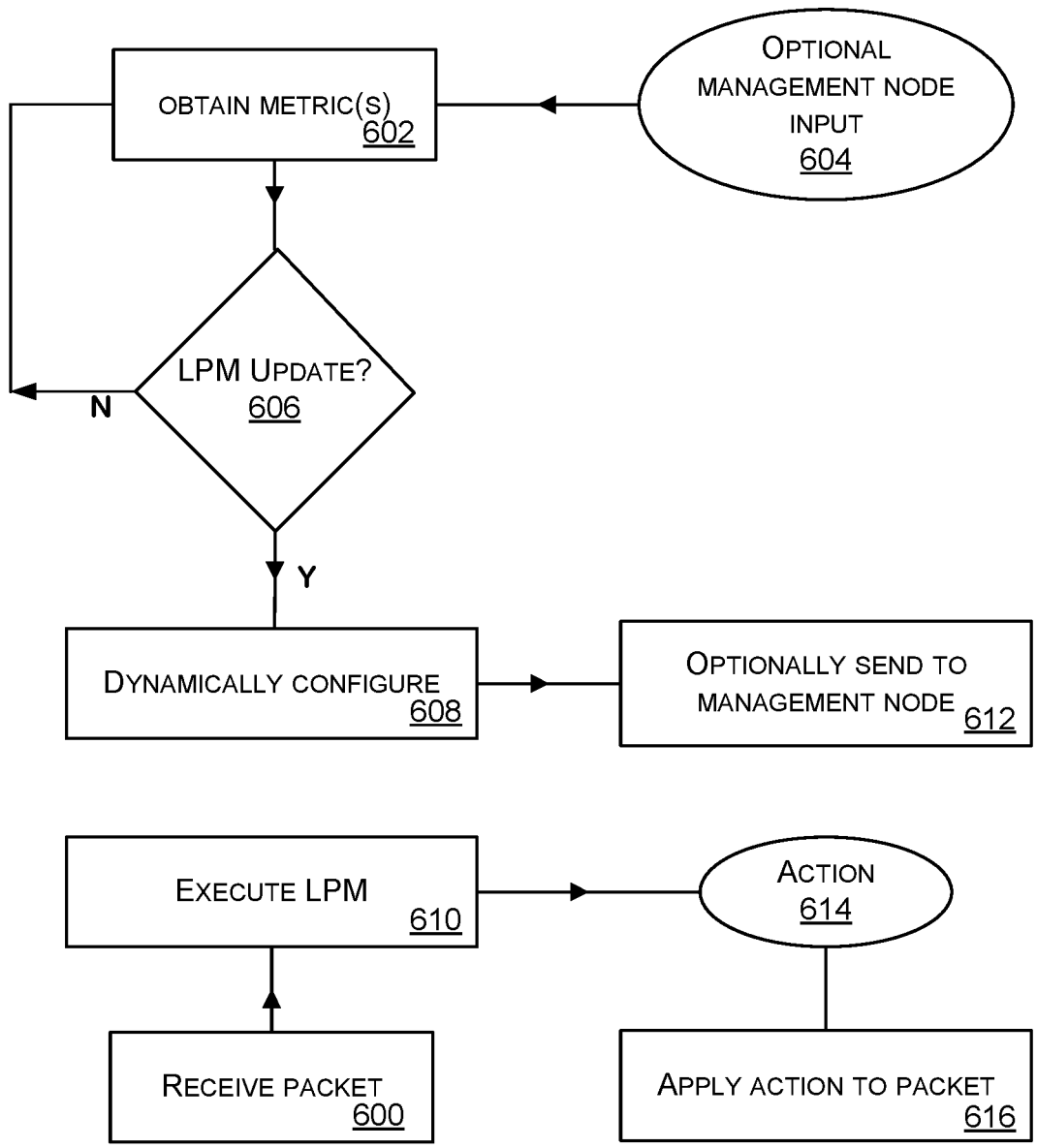
FIG. 6 is a flow diagram of a method performed by a communications network node.

FIG. 6 is a flow diagram of a method performed at a communications network node. The node is an access control list, a policy enforcement node, a firewall, a router, a routing information base, a forward information base or any other node of a packet based communications network which has a longest-prefix match process. The method comprises a first path depicted using items 600, 610, 614, 616 and a second path depicted using items 602, 604, 606, 608, 612. The first path occurs each time a packet is processed. The second path occurs at a slower rate to the first path. The first path and the second path operate in parallel or in serial fashion. The first path is a packet processing path. The second path is a configuration path.

The packet processing path comprises the node receiving a packet 600 which has an associated address such as a port address or an internet protocol address. The longest-prefix match process is then carried out at operation 610 and a longest-prefix match is found for the address associated with the received packet from operation 600. The longest-prefix match has an associated action 614 which is applied 616 to the packet.

The configuration path comprises the node obtaining one or more metrics 602. The metrics are obtained from one or more elements of the node (such as an operating system or an application resource manager) and/or from other nodes of the communications network. In some cases optional management node input is received 604. The management node input is either metrics from other nodes of the communications network or is configuration data for configuring a longest-prefix match process of the node.

The communications network node checks at operation 606 whether or not to update a longest-prefix match process of the node. The check involves assessing whether relevant trigger condition has been met, such as whether a specified period of time has elapsed, and/or whether a resource limit has been reached. If an update is to be done to the longest-prefix match process, the relevant trigger condition has been met, then the operation 608 is carried out to dynamically configure the longest-prefix match process. The dynamic configuration comprises searching for a value of k given the metrics and taking into account any constraints or policy. The searching is done using any one or more of: rules, machine learning, gradient based descent. The results of the dynamic configuration are optionally sent 612 to the management node.

At check 606 if it is found that no dynamic configuration is needed then the process moves to operation 602.

Figure 7:
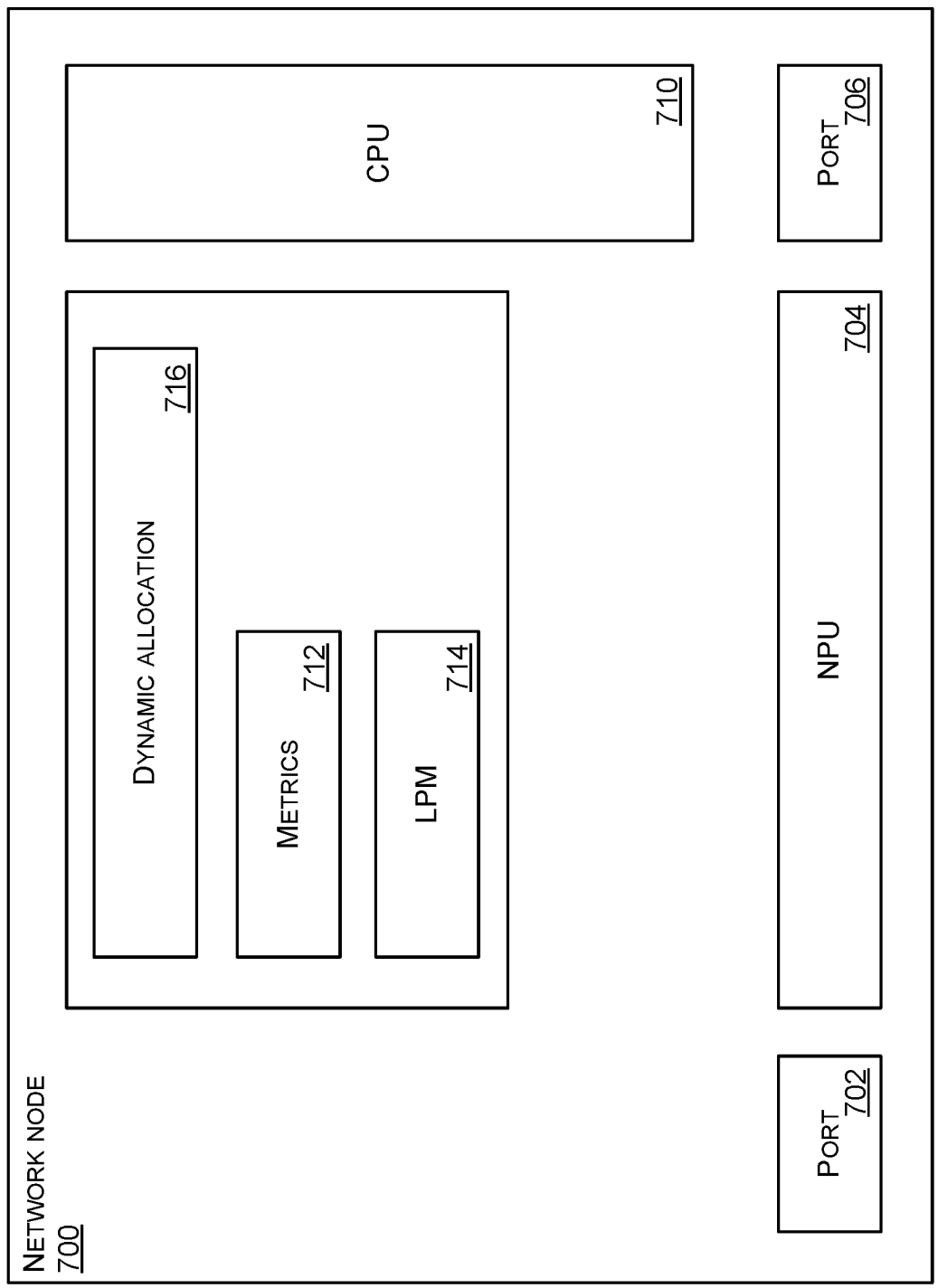
FIG. 7 is a schematic diagram of a communications network node.

FIG. 7 is a schematic diagram of a communications network node 700 comprising a central processing unit 710. The node 700 has at least two ports 702, 706 to receive packets at and forward packets from. It has a network processing unit 704 to send and receive packets from the ports 702, 706. The node 700 has dynamic allocation functionality 716, metrics 712 and a longest-prefix match process 714.

The CPU 710 and NPU 704 are processors which are microprocessors, controllers or any other suitable type of processors for processing computer executable instructions to control the operation of the node in order to receive packets from other nodes in a communications network and act on the packets to filter or forward the packets. In some examples, for example where a system on a chip architecture is used, the processors 704, 710 include one or more fixed function blocks (also referred to as accelerators) which implement a part of the method of packet processing and/or longest-prefix matching in hardware (rather than software or firmware).

The computer executable instructions are provided using any computer-readable media that is accessible by node 700. Computer-readable media includes, for example, computer storage media such as memory 718 and communications media. Computer storage media, such as memory 718, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 718) is shown within the node 700 it will be appreciated that the storage is, in some examples, distributed or located remotely and accessed via a network or other communication link (e.g. from ports 702, 706).

Alternatively or in addition to the other examples described herein, examples include any combination of the following:

Clause A. A method of internet protocol address matching performed by a node of a communications network, the node comprising a virtual routing function or policy enforcement node, the method comprising:
   carrying out a first process and a second process, wherein the first process comprises:
   receiving at least one packet having an associated internet protocol address;
   using a longest-prefix match process and the associated address to identify an action; and applying the action to the packet; and wherein the second process comprises:
   obtaining one or more metrics; and dynamically configuring the longest prefix match process on the basis of at least the received metrics.

Clause B The method of clause A wherein using the longest-prefix match process and the associated address to identify an action comprises searching one or more data structures at the node to find an entry having a longest-prefix match with the associated address.

Clause C The method of clause B comprising dynamically configuring the longest-prefix match process only when the one or more data structures are being updated.

Clause D The method of clause C wherein dynamically configuring the longest-prefix match process occurs together with an atomic switch of the one or more data structures.

Clause E The method of clause A wherein dynamically configuring the longest-prefix match process comprises selecting the longest-prefix match process from a plurality of available longest-prefix match processes using information about resource requirements and performance of individual ones of the longest-prefix match processes.

Clause F The method of any preceding clause wherein dynamically configuring the longest-prefix match process comprises setting a value of at least one parameter of the longest-prefix match process.

Clause G The method of clause F wherein the parameter is a number of bits of an address to be used in a first stage of the longest-prefix match process.

Clause H The method of any preceding clause wherein the node comprises a memory storing a table configured for direct indexing, and at least one list or tree data structure, and where the longest-prefix match process comprises a parameter controlling a size of the table with respect to the size of the list or tree data structure.

Clause I The method of any preceding clause wherein obtaining the metrics comprises observing the metrics from the node or communications network, and where the metrics comprise one or more of: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, usage.

Clause J The method of any preceding clause wherein dynamically configuring the longest prefix match process comprises taking into account one or more constraints selected from: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, usage.

Clause K The method of clause J wherein one or more of the constraints relate to other nodes of the communications network.

Clause L The method of clause J wherein dynamically configuring the longest-prefix match process comprises optimizing use of resources of the node within the specified constraints.

Clause M The method of clause J wherein dynamically configuring the longest-prefix match process comprises taking into account metrics of one or more other nodes of the communications network within the specified constraints or prioritizing between a plurality of longest-prefix match processes in a single node.

Clause N The method of any preceding clause wherein the node comprises any of a firewall, an access control list, a routing function, a policy enforcement node.

Clause O A communications network node comprising:
   a memory storing at least one received packet having an associated internet protocol address;
   the memory storing one or more metrics and instructions which when implemented at a processor of the node:
   carry out a first process and a second process, wherein the first process comprises:
   receiving at least one packet having an associated internet protocol address;
   using a longest-prefix match process and the associated address to identify an action; and
   applying the action to the packet;
   and wherein the second process comprises:
      obtaining one or more metrics; and
      dynamically configuring the longest prefix match process on the basis of at least the received metrics.

Clause P The communications network node of clause N comprising a plurality of longest-prefix match processes, one of which is the first longest-prefix match process, and wherein the instructions, when implemented at the processor, dynamically configure the plurality of longest-prefix match processes.

Clause Q The communications network node of clause O wherein the instructions, when implemented at the processor, apply:
   at a first cadence, an overall dynamic configuration to the plurality of longest-prefix match processes; and
   at a second cadence, individual dynamic configurations to individual ones of the longest-prefix match processes;
   where the first cadence is controllable with respect to the second cadence.

Clause R The communications network node of any of clauses N to Q wherein the instructions, when implemented at the processor, take into account a policy when dynamically configuring the plurality of longest-prefix match processes in order to differently configure individual sets of the longest-prefix match processes.

Clause S A communications network comprising:
   a plurality of communications network nodes;
   individual ones of the communications network nodes comprising:
      a memory storing at least one received packet having an associated address;
      the memory storing one or more metrics and instructions which when implemented at a processor of the node:

carry out a first process and a second process, the first process being carried out at a faster rate than the second process, wherein the first process comprises:
receiving at least one packet having an associated address;
using a longest-prefix match process and the associated address to identify an action; and
applying the action to the packet;
and wherein the second process comprises:
obtaining one or more metrics; and
dynamically configuring the longest prefix match process on the basis of at least the received metrics; and
a management node, which sends instructions to the communications network nodes according to an overall dynamic configuration of the plurality of longest-prefix match processes.

Clause T The communications network of clause S wherein one or both of the management node and the individual ones of the communications network nodes carry out dynamic configuration in response to one or more of: an interval of time, a resource limit.

A method for internet protocol address matching performed by a computing device of a communications network, the computing device executing a virtual routing function or policy enforcement node, the method comprising: obtaining one or more metrics;
dynamically configuring a longest-prefix match process on the basis of the one or more metrics;
receiving a packet having an associated internet protocol address;
executing the longest-prefix match process on the associated internet protocol address;
identifying an action based on the execution of the longest-prefix match process; applying the action to the packet; and
dynamically reconfiguring the longest-prefix match process based on updates to the one or more metrics.

The method of any of the above clauses, wherein the dynamically reconfiguring operation is executed at a different rate than the receiving, executing, identifying, and applying operations.

A system comprising:
one or more processors; and
a memory in communication with the one or more processors, the memory having computer-readable instructions stored thereupon that, when executed by the one or more processors, cause the system to perform operations comprising:
receiving a packet having an associated internet protocol address;
using a longest-prefix match process and the associated address to identify an action;
applying the action to the packet;
wherein the longest-prefix match process is dynamically configured on the basis of one or more metrics.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for internet protocol address matching performed by a node of a communications network, the node implemented on a computing device comprising a processor and memory, the method comprising:
obtaining one or more metrics associated with the node or communications network;
configuring a longest-prefix match process based on the one or more metrics;

processing a first packet having an associated internet protocol address, the processing comprising:
  executing the longest-prefix match process on the associated internet protocol address;
  identifying one of a plurality of actions based on the execution of the longest-prefix match process; and
  applying the identified action of the plurality of actions to the first packet;
dynamically reconfiguring the longest-prefix match process based on updates to the one or more metrics; wherein:
  the dynamically reconfiguring comprises updating a data structure storing prefixes for the longest-prefix match process; and
  the data structure is updated atomically; and
processing a second packet using the dynamically reconfigured longest-prefix match process.

2. The method of claim 1, wherein the identifying an action comprises searching one or more data structures at the node to find an entry having a longest-prefix match with the associated address.

3. The method of claim 2, wherein the dynamically configuring and dynamically reconfiguring is performed only when the one or more data structures are being updated.

4. The method of claim 3, wherein the dynamically configuring and dynamically reconfiguring is performed with an atomic switch of the one or more data structures.

5. The method of claim 1, wherein the dynamically configuring and dynamically reconfiguring comprises selecting the longest-prefix match process from a plurality of available longest-prefix match processes using information about resource requirements and performance of individual ones of the longest-prefix match processes.

6. The method of claim 1, wherein the dynamically configuring and dynamically reconfiguring comprises setting a value of at least one parameter of the longest-prefix match process.

7. The method of claim 6, wherein the at least one parameter is a number of bits of an address to be used in a first stage of the longest-prefix match process.

8. The method of claim 1, wherein the node comprises a memory storing a table configured for direct indexing, and at least one list or tree data structure, and where the longest-prefix match process comprises a parameter controlling a size of the table with respect to the size of the list or tree data structure.

9. The method of claim 1, wherein the obtaining one or more metrics comprises observing the metrics from the node or communications network, and wherein the metrics comprise one or more of: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, or usage.

10. The method of claim 1, wherein the dynamically configuring and dynamically reconfiguring comprises taking into account one or more constraints selected from: a number of routes in a forward information base at the node, a packet rate in a forward information base at the node, a number of routes in a forward information base in the communications network, a packet rate in a forward information base in the communications network, a measure of utilization of the communications network, an amount of available memory, a number of available memory controllers, a cache size, usage of processor resources, buffer availability, ternary content-addressable memory, TCAM, or usage.

11. The method of claim 10, wherein one or more of the constraints relate to other nodes of the communications network.

12. The method of claim 10, wherein the dynamically configuring and dynamically reconfiguring comprises optimizing use of resources of the node within the constraints.

13. The method of claim 10, wherein the dynamically configuring and dynamically reconfiguring comprises either: taking into account metrics of one or more other nodes of the communications network within the constraints; or prioritizing between a plurality of longest-prefix match processes in a single node.

14. The method of claim 1 wherein the node comprises any of a firewall, an access control list, a routing function, or a policy enforcement node.

15. A communications network node comprising:
  one or more processors; and
  a memory in communication with the one or more processors, the memory having computer-readable instructions stored thereupon that, when executed by the one or more processors, cause the communications network node to perform operations comprising:
  processing a first packet having an associated internet protocol address, the processing comprising:
  using a first longest-prefix match process and the associated internet protocol address to identify an action of a plurality of actions;
  applying the action to the first packet;
  dynamically reconfiguring the first longest-prefix match process on the basis of one or more metrics, wherein:
    the dynamically reconfiguring comprises updating a data structure storing prefixes for the first longest-prefix match process and the plurality of actions; and
    the data structure is updated atomically.

16. The communications network node of claim 15, wherein the first longest-prefix match process is selected from a plurality of longest-prefix match processes, and wherein the instructions, when executed by the one or more processors, cause the communications network node to dynamically configure the plurality of longest-prefix match processes.

17. The communications network node of claim 16, wherein the instructions, when executed by the one or more processors, apply:
  at a first cadence, an overall dynamic configuration to the plurality of longest-prefix match processes; and
  at a second cadence, individual dynamic configurations to individual ones of the longest-prefix match processes;
  wherein the first cadence is controllable with respect to the second cadence.

18. The communications network node of claim 16, wherein the dynamically configuring the plurality of longest-prefix match processes comprises differently configuring individual sets of the longest-prefix match processes based on a policy.

19. A communications network comprising:
  a management node and a plurality of communications network nodes;
  the management node and communications network nodes comprising:

a processor and a memory storing instructions which when executed by at least the processor, cause the communications network to perform operations comprising:

executing a first process and a second process, the first process being carried out at a faster rate than the second process, wherein the first process comprises:
 receiving at least one packet having an associated address;
 using a longest-prefix match process and the associated address to identify an action; and
 applying the action to the packet;
and wherein the second process comprises:
 obtaining one or more metrics; and
  dynamically configuring the longest-prefix match process on the basis of at least the obtained metrics; and
sending instructions to the communications network nodes according to an overall dynamic configuration of the longest-prefix match process; wherein:
 the dynamically configuring comprises updating a data structure storing prefixes for the longest-prefix match process; and
the data structure is updated atomically.

20. The communications network of claim 19, wherein at least one of the management node or individual ones of the communications network nodes carry out dynamic configuration in response to one or more of: an interval of time or a resource limit.

* * * * *